United States Patent Office 3,836,461
Patented Sept. 17, 1974

---

3,836,461
TREATMENT AND USE OF WASTE EFFLUENT STREAMS
Richard T. Whitehead, Westfield, Benjamin J. Luberoff, Summit, and Morgan Chuan-Yuan Sze, Upper Montclair, N.J., assignors to The Lummus Company, Bloomfield, N.J.
Filed Sept. 7, 1972, Ser. No. 286,939
Int. Cl. B01d 1/24
U.S. Cl. 210—56                                                6 Claims

ABSTRACT OF THE DISCLOSURE

An aqueous waste stream from an industrial chemical or other processing plant can be utilized to furnish cooling water for use in the same or another plant by partially vaporizing it in a cooling tower, after filtering off any suspended solids, utilizing the cooled liquid as cooling water for heat exchangers, and returning the heat-exchanged water to the cooling tower. Chemicals precipitated from the waste stream during vaporization can be recovered or burned as fuel in the plant. Small amounts of volatile wastes can be removed by vaporization in the cooling tower. Total recycle or elimination of all materials in the waste stream results in the reduction or elimination of pollution of local waters.

BACKGROUND OF THE INVENTION

In many manufacturing operations, aqueous waste streams are generated which contain low but noxious concentrations of various chemicals. Disposition of such streams is a universal problem which, particularly with the increasing awareness of ecology and of protecting the environment, should not be solved by discharging into rivers or injecting into deep wells, as was, unfortunately performed in the past. On the other hand, the cost of concentrating these streams into smaller volumes which could be recycled is usually prohibitively high in power, capital, and maintenance.

Furthermore, the waste water of many industrial plants and other installations carries away with it valuable materials which, because of their low concentration in the water, are generally deemed impractical to recover. In some cases, the chemicals contained in the aqueous waste stream are of sufficient value and quantity to commercially justify their recovery by various techniques. In other cases, it has been possible, although at some cost, to concentrate the chemicals for use as fuel or fertilizer. However, in many cases, the concentration of chemicals is too low for economic recovery, or the stream contains a mixture of chemicals which cannot be readily economically separated.

It is well known that the composition of the water with regard to various contaminants and impurities must meet certain minimum requirements. In these and other industries, particularly the chemical industry which has developed during the last decades, not only have minimum quality requirements been established, but there has been an increasing employment of river water and other surface waters, and with this has come the inevitable waste disposal resulting in an increasing pollution of these waters. These facts have helped to make the problem of efficient water purification more urgent.

Most such plants have facilities for cooling process streams during processing. Usually this function is performed by a cooling tower, in which locally obtained water is partially evaporated by ambient air to provide the cooling effect. The local water make-up also represents a processing cost.

In view of this situation, it would be desirable to be able to utilize the aqueous waste streams presently discarded by such plants to replace part or all of the locally obtained cooling water make-up. This would accomplish a reduction in potential water pollution in the area of the plant and a saving in cost of obtaining local cooling water. It would also make the location of such a plant less dependent on the availability of local cooling water, thus enabling the plant owner to choose from a wider variety of available plant sites. If, in addition to the above, the chemicals contained in the aqueous waste stream could be at least partly recovered for some useful purpose, further savings and advantages could be realized.

SUMMARY OF THE INVENTION

The above advantages, and others which will become obvious to those skilled in the art from this specification can be achieved by a process comprising:

passing an aqueous waste stream from a processing plant, containing at least one suspended or dissolved chemical, through a cooling tower, during which passage at least a portion of the chemical content is precipitated;

separating the precipitated chemical content from the cooled aqueous stream;

passing the aqueous stream in indirect heat exchange with one or more process streams in a plant;

returning the heated aqueous stream to the cooling tower; and recovering the precipitated chemical content.

The use of the process of this invention in a plant can result in some or all of the following advantages:

omission or lessening of the requirement for local cooling water;

recovery of low level heat energy produced in the plant which is usually discarded, and consequent conservation of heat energy;

reduction in overall fuel requirements if the recovered chemical content is utilized for fuel;

recovery of useful chemicals;

recovery of intermediate products for recycle to the plant and subsequent conversion to desired products;

decrease of problems of water pollution control in waste effluent streams;

elimination or lessening of potential local water pollution;

elimination or lessening of potential thermal pollution caused by the heat content of waste streams; and removal of some pollutants through vaporization without affecting local water or air conditions.

THE DRAWINGS

DETAILED DESCRIPTION OF THE INVENTION

Figure 1:
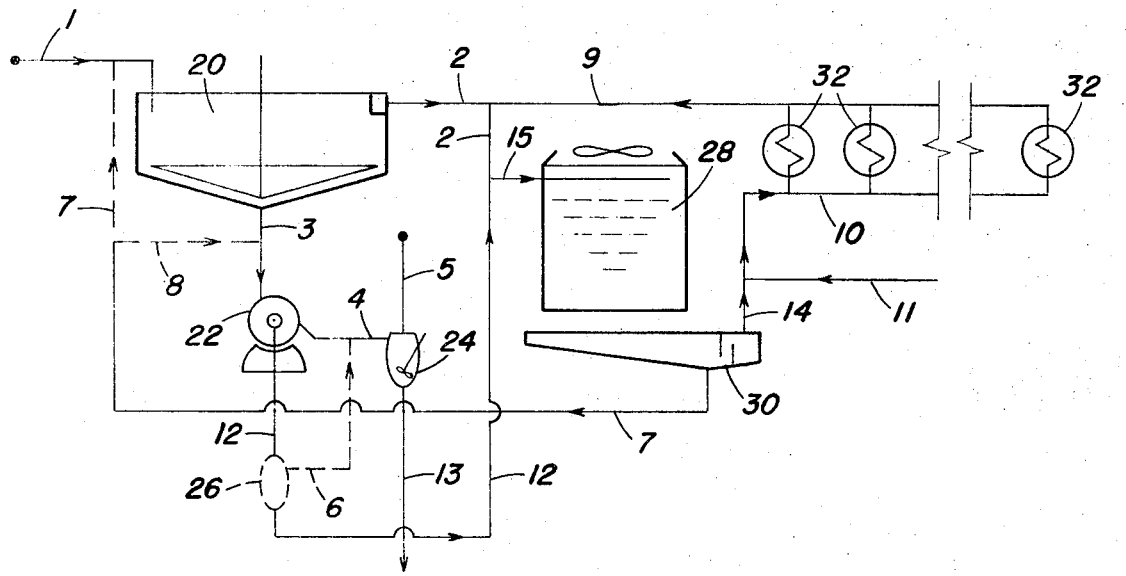
FIG. 1 is a flow diagram depicting the process of the invention for treating an aqueous waste stream in the form of a slurry.

Referring to FIG. 1, the aqueous waste stream is conducted in line 1 to a settling basin 20, in which the contained solids are permitted to settle to the bottom. Flocculating and/or anti-foam agents may be added to facilitate settling. The heavy sludge is removed in line 3 to filtering or centrifuging apparatus 22 (in this Figure shown as a rotary filter). Light immiscible liquids can be skimmed off the top of settling basin 20.

The filtrate discharged from apparatus 22 is then introduced via line 12 into the top of cooling tower 28. If necessary, the filtrate can first be introduced into another settling basin 26 for removal of heavy immiscible liquids. Alternatively the filtrate can be returned to the settling basin 20.

The filtrate in line 12 is introduced into the cooling tower through line 15, together with the clear liquid overflow from settling basin 20, transmitted via line 2, and recycled cooling water in line 9. In the cooling tower, the aqueous waste stream becomes concentrated due to evaporation of part of the water, forming an aqueous saturated solution of the contained chemicals. Concentration of the effluent in this manner also will result in precipitation of some waste components.

Cooling water is removed via line 14 from settling basin 30 and fed through heat exchangers 32 via line 10, cooling one or more process streams. The heated coolant is then returned in line 9 to the cooling tower. Sludge from settling basin 30 is removed in line 7 and either passed to settling basin 20 or, via line 8, to filter 22.

Figure 2:
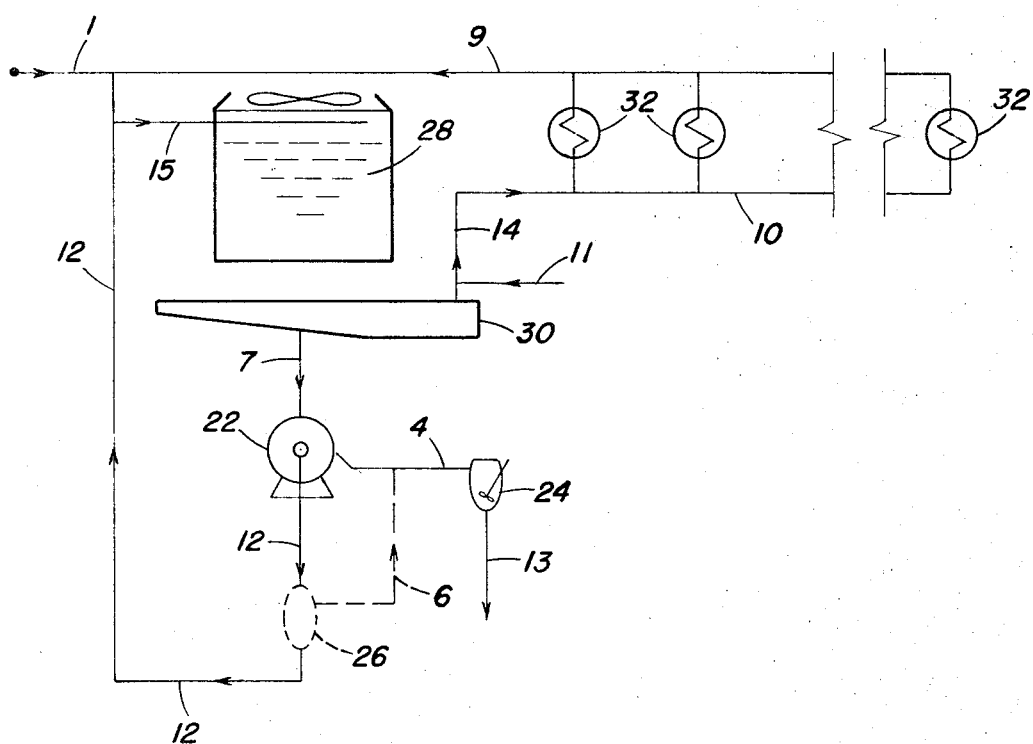
FIG. 2 is a flow diagram depicting the process of this invention for treating an aqueous waste stream in the form of a solution.

If the aqueous waste stream is in the form of a solution rather than a slurry, the flow diagram of FIG. 1 becomes simplified, as shown in FIG. 2. The waste solution in line 1 is introduced directly into cooling tower 28 through line 15, along with recycled aqueous streams in lines 9 and 12. The aqueous layer in settling basin 30 is removed in lines 14 and 10, used to cool one or more process streams in heat exchangers 32, and recycled to the cooling tower in line 9. The sludge from settling basin 30 is carried via line 7 to rotary filter 22, and the filtrate and solids from the filter disposed of as in FIG. 1.

An important feature of the process of the present invention is that it permits the recovery and efficient use of the low-level heat content of the aqueous waste stream. This heat already contained in the waste stream serves as part of the heat necessary to effect evaporation and concentration of the stream in the cooling tower operation. These waste streams, coming from processing steps in the plant, can be at temperatures over 100° F. but usually below about 200° F. The heating value represented by these warm streams is generally discarded, representing both a loss in heat efficiency of the plant and a potential problem of thermal pollution if the temperature of the waste stream is on the high side.

Generally speaking, the amount of liquid in the waste stream introduced into the cooling water system is small— on the order of 1–4 percent. The majority of the water evaporated in the cooling tower is the recycled liquid from the heat exchangers in line 9, which also serves as the major source of heat for the cooling tower operation. The waste stream thus serves essentially to furnish make-up water to the system. If necessary, additional make-up water can be added in line 11.

It should be noted that the term "cooling tower" as used herein, is not intended to limit the invention to utilization in free-standing open-air equipment. The cooling tower can be constructed as a free-standing tower or be enclosed within another structure, such as a building; what is important is the operation of the equipment-partial evaporation of the aqueous streams using large quantities of air or other gas.

The process described herein is suitable for treating a wide variety of aqueous waste streams, which may either contain organic or inorganic chemicals, or both. Generally speaking, the streams which can best be treated by this process are those in which the dissolved or suspended chemicals have relatively low volatility and relatively low solubility, and are relatively non-corrosive. It is preferable that the chemicals possess a solubility which is directly, rather than inversely, proportional to temperature, but chemicals having an inverse solubility with respect to temperature can also be handled, as described hereinafter. Aqueous waste streams containing liquid wastes can be treated if the liquid wastes are immiscible with water.

The process of this invention is thus suitable for treating many aqueous waste streams from processing plants, except such as contain large amounts of odoriferous or toxic volatile materials (e.g. sewage, blood, brewery wastes, cyanide waste streams and amine or ammonium hydroxide-containing streams) or corrosive materials (e.g. pickling or other chloride-containing wastes); in the first instance because of the potential air pollution problems caused by evaporation of such wastes, and in the second because of likelihood of damage to the cooling tower. In addition to aqueous waste streams from organic and inorganic chemical plants, the process can be used, for example, for treating, aqueous petroleum refinery wastes, scrubber liquors from food plants, aqueous wastes from flour and starch plants, aqueous waste streams from thickeners in pulp mills and paper making plants (after clarification and removal of fibrous material) and aqueous mine wastes which are non-corrosive, plus numerous other streams.

The solid and/or liquid chemicals recovered from the waste stream can be utilized in one or more ways, according to their nature, composition, and matters relating to economics of recovery and re-use.

If the chemicals in the sludge have heating value as is the case with most organic chemicals, the sludge can, along with its contained water, be mixed with fuel to boilers and other apparatus. If the sludge is largely organic, its fuel value is frequently high enough to provide the heat necessary to vaporize up to 70 percent contained water.

Alternately the sludge can be treated to recover valuable chemicals contained in it, if feasible and economically desirable. For example, if the sludge consists of mainly one chemical, it can, if desired, be purified. Alternately, if the sludge contains substantial amounts of readily separable chemicals, these can be recovered.

In some cases the sludge from refineries or organic synthesis processes may contain unreacted or partially reacted starting materials which may be recycled to the process for production of additional product. Such is also the case with some waste streams from mining operations. The inorganic minerals and chemicals recovered have little or no fuel value, but they can be recycled to ore processing steps.

For example, in the process as shown in FIG. 1, sludge from filter 22 is mixed in tank 24 with fuel oil introduced via line 5, the mixture is removed in line 13 and used for fuel in the plant as needed. Immiscible liquids in the waste stream can be removed by passing the filtrate from filter 22 into another settling basin 26. The immiscible liquid layer is removed in line 6 and incorporated in the sludge fuel oil mixture. The choice of whether to utilize the sludge for fuel, or fertilizer, or to recover chemicals contained in it, is essentially based on two factors: the technical feasibility of recovering the chemical or chemicals and the economics of doing so, as opposed to utilization for fuel.

In addition to the removal of low concentrations of some volatile components by vaporization, the cooling tower operation can also dispose of certain non-volatile constituents by effectively dissociating them into volatile ones. Ammonium salts particularly salts of acids which are sparingly soluble or insoluble in water, can be disposed of in this way. For example, ammonium benzoate can be destroyed by removal of a small but significant equilibrium concentration of free ammonia produced by hydrolysis of the dissolved salt, by vaporization and stripping in the cooling tower operation. The benzoic acid which is left behind, precipitates and is removed in the sludge.

The concentration of materials in the circulating cooling water is sufficiently low to produce a non-corrosive medium. It is significant to point out in this connection, however, that care must be exercised to prevent certain solid materials from precipitating when the coolant solution is warmed in the exchanger circuit. Such behavior is typical of materials which have a so-called inverse solubility temperature relationship such as is well established for most calcium salts. Thus, if the waste contains calcium salts, it must be diluted with either raw effluent or fresh water to a concentration which will not scale when it is heated in the heat exchangers. This is conveniently done in line 11. The introduction of a diluent in line 11 is done only where necessary to prevent such precipitation; it is not done in most cases. As an alternative, the diluent in line 11 can be introduced into the top of settling basin 30.

In general, air is used as the cooling gas in cooling tower systems because of its ready availability in the large amounts required for operation. However, other gases can be used, if available in sufficient quantity. For example, in air separation plants, large amounts of nitrogen are produced, which can be used to replace part or all of the air used in the cooling towers. The aqueous waste stream used in the process is preferably produced in the same processing plant in which the present process is carried out, but it may also be brought from another plant if this is found to be economically or otherwise desirable or feasible.

One example of the use of this invention is in dealing with waste streams from a plant which produces terephthalic acid by hydrolysis of terephthalonitrile. The aqueous effluents from such a plant will contain, inter alia, varying amounts of ammonia, terephthalonitrile, tolunitrile, benzonitrile, terephthalic acid, toluic acid, benzoic acid, and ammonium salts of these acids.

It was found that the process of the present invention can effectively utilize aqueous streams containing these materials. The ammonium salts are dissociated in the cooling tower; the remaining materials can be precipitated and mixed with fuel oil. The stream in line 11 will contain additional ammonia to prevent the precipitation of terephthalic acid in the heat exchangers. For example, from a plant designed to produce 300,000,000 pounds per year of terephthalic acid by hydrolysis of terephthalonitrile, aqueous waste streams from several processing steps can be combined to produce a stream comprising about 84,648 pounds of material per hour, containing:

| | Lb./hr. |
|---|---|
| Tolunitrile | 11 |
| Terephthalonitrile | 672 |
| Benzonitrile | 156 |
| Terephthalic acid | 9 |
| Ammonium terephthalates | 165 |
| Water | 83,635 |

According to the process of FIG. 1, the combined stream is introduced via line 1 into settling basin 20.

The sludge, comprising tolunitrile (approx. 1 lb./hr.), benzonitrile (approx. 6 lb./hr.), terephthalonitrile (672 lb./hr.), terephthalic acid (149 lb./hr.) mainly transferred from the sludge in basin 30 and water (821 lb./hr.) is recovered and slurried in tank 24 with fuel oil from line 5.

Filtrate, comprising the remainder of the water, tolunitrile ammonium terephthalates and benzonitrile, is introduced via lines 2, 12, and 15 into cooling tower 28, along with recycled cooling water in line 9. Air is passed through the cooling tower at a rate of about 5,500,000 lbs./hr., and the air leaving the tower would carry with it about 287,200 lbs./hr. water, plus all the benzonitrile and tolunitrile stripped from the circulating cooling water (150 and 10 lbs./hr. respectively), and about 58 lbs./hr. ammonia formed by decomposition of ammonium terephthalates.

The liquid removed from settling basin 30 under the cooling tower, is passed via lines 10 and 9 through heat exchangers 32. Ammonia still bottoms, comprising about 205,000 lbs./hr. water and 33 lbs./hr. ammonia are added in line 11 to maintain the terephthalic acid in solution. The total stream circulating through the heat exchangers comprises more than 12,500,000 lbs./hr. of material.

Thus, the benzonitrile and tolunitrile have been effectively disposed of by vaporization in the cooling tower, the terephthalonitrile and terephthalic acid burned for fuel, and ammonium salts removed in the cooling tower by dissociation into ammonia and terephthalic acid.

What is claimed is:

1. In a processing plant in which is produced at least one aqueous waste stream containing dissolved chemical matter selected from the group consisting of tolunitrile, terephthalonitrile, benzonitrile, terephthalic acid, ammonium terephthalates, and mixtures thereof, and which plant also includes a recirculating cooling water system including a cooling tower and means for indirect heat exchange between the cooling water and at least one process stream, the improvement comprising introducing the aqueous waste stream as make-up water into the cooling tower, at least a portion of the chemical matter being precipitated in the cooling tower, and recovering the precipitated chemical matter.

2. A process according to Claim 1 in which the aqueous waste stream is in the form of a slurry and solid materials are separated from the slurry prior to introducing said aqueous waste stream into the cooling tower.

3. A process according to Claim 2 in which the said solid materials are combined with the precipitated chemical matter.

4. A process according to Claim 1 in which the chemical matter is recovered and used as fuel in the processing plant.

5. A process according to Claim 1 wherein the dissolved chemical matter comprises ammonium terephthalates.

6. A process according to Claim 1 wherein the processing plant is one for production of terephthalic acid by hydrolysis of terephthalonitrile.

References Cited

UNITED STATES PATENTS

| | | | |
|---|---|---|---|
| 3,299,619 | 1/1967 | Terry | 261—Dig. 11 |
| 3,666,246 | 5/1972 | Cohen | 60—95 R |

OTHER REFERENCES

*Water Treatment for Industrial and Other Uses*, E. Nordell Reinhold, N.Y., 1961, 2nd Ed., pp. 290, 291, 293.

*Sewerage and Sewage Treatment*, Babbitt el al., Wiley, N.Y., 1958, p. 324.

*Chemical Week*; "Water Reuse Leads to Product Recovery," Mar. 31, 1971, pp. 26, 27.

CHARLES N. HART, Primary Examiner

B. CASTEL, Assistant Examiner

U.S. Cl. X.R.

210—67, 71, 73